United States Patent [19]

Duplessis

[11] Patent Number: 5,080,385
[45] Date of Patent: Jan. 14, 1992

[54] COMPOSITE BICYCLE FRAME AND METHOD OF MAKING SAME

[76] Inventor: Delano A. Duplessis, 3 Lynne St., Van Buren, Me. 04785

[21] Appl. No.: 529,122

[22] Filed: May 25, 1990

[51] Int. Cl.$^5$ ............................................. B62K 19/18
[52] U.S. Cl. ............................ 280/281.1; 280/288.3; 264/258; 264/314
[58] Field of Search ............... 280/274, 281.1, 284, 280/288.3; 264/258, 314

[56] References Cited

U.S. PATENT DOCUMENTS

| | | | |
|---|---|---|---|
| 4,493,749 | 1/1985 | Brezina | 280/281.1 X |
| 4,828,285 | 5/1989 | Foret et al. | 280/279 |
| 4,900,048 | 2/1990 | Derujinsky | 280/281.1 |
| 4,902,458 | 2/1990 | Trimble | 264/314 X |

Primary Examiner—Kenneth R. Rice
Assistant Examiner—Victor E. Johnson
Attorney, Agent, or Firm—Sixbey, Friedmen, Leedom & Ferguson

[57] ABSTRACT

An essentially seamless bicycle frame of fiber reinforced, resin impregnated composite material and a method by which it is produced to have a top tube portion, hollow down tube portion, a seat tube portion, a head tube corner at which the top tube portion meets the down tube portion and a head tube insert is incorporated, a bottom bracket corner at which the down tube portion meets the seat tube portion and a bottom bracket insert is incorporated, and a seat tube corner at which the top tube portion meets the seat tube portion and a seat tube insert is incorporated by molding and curing of tubular preforms that were produced by rolling or wrapping layers of resin impregnated fiber material on a mandrel, each preform having been removed from the mandrel on which it was formed in an uncured tubular form. Additionally, connector tube section preforms, which are integrated into the corners, are also formed in this manner. For purposes of forming the corners, at least two integral flap portions are produced, on at least one end of at least one of the preforms to be joined, by axially slitting it. The flaps form overlapping portions that are integrally united with each other by a molding and curing operation. As a result, the frame produced requires no connecting strips or patches to join circumferentially continuous tubular components of the frame. Furthermore, the insert-incorporating corners at which the tube portions meet are also essentially seamless. A structural foam and optional nonstructural, cosmetic prepreg coverings may also be incorporated into the corners. These concepts are also extended to formation of wishbone-shaped seat and chain stays that are joined to form a rear wheel assembly by an end frame with replaceable drop-outs.

33 Claims, 6 Drawing Sheets

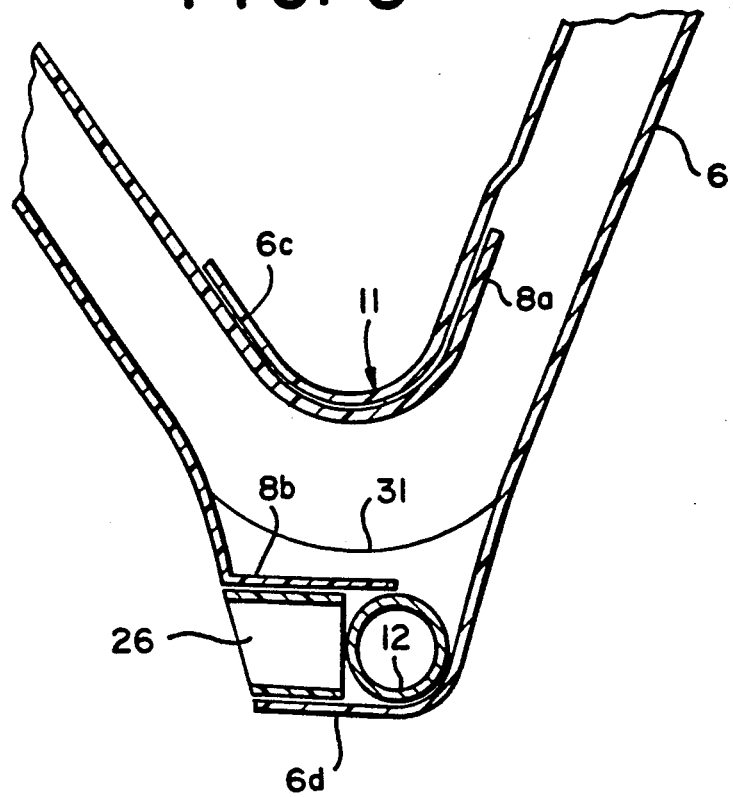
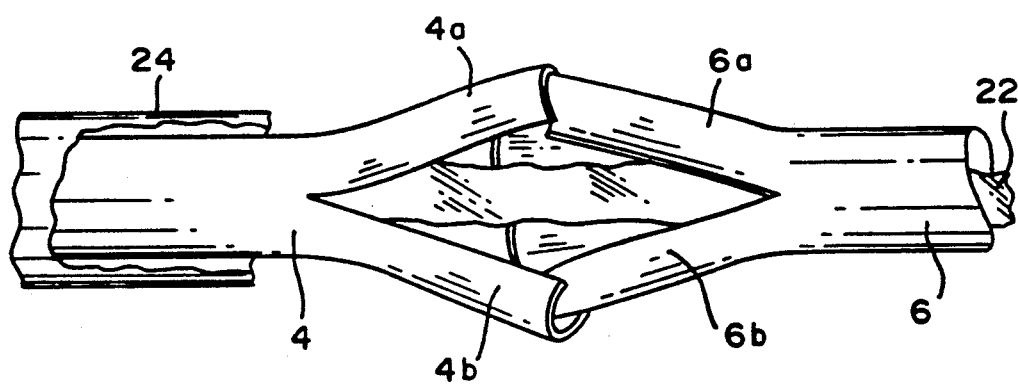

COMPOSITE BICYCLE FRAME AND METHOD OF MAKING SAME

BACKGROUND OF THE INVENTION

1. Technical Field

The present invention relates to bicycle frames that are engineered specifically for racing and high-performance, recreational riding. In particular, the invention relates to bicycle frames that are formed from lightweight and tough composite materials, and also to the methods by which such bicycle frames are produced.

2. Description of Related Art

Over the years, bicycle frames have been made of any number of different materials, primarily metals such as iron and steel, but more recently, in an attempt to reduce weight, aluminum, titanium, and composite materials have been utilized. A composite material is a heterogeneous material created from high-strength fiber reinforcements and an appropriate matrix material in order to maximize specific performance properties. More specifically, layers of graphite fibers, glass fibers, aramid fibers, polyethylene fibers or other fibers or combinations of unidirectional or woven fibers are formed as continuous, epoxy pre-impregnated layers that are commonly referred to as "prepreg."

In the case of frames formed of metal components, specifically, the frame has been formed of individual tubular components that are secured together by welding, brazing or the like. Of course, such techniques cannot be utilized in the case of frames formed of fiber and resin composite materials.

In the case of tubular frame components that have already been cured (the process by which the flexible prepreg is converted from a flexible material in a workable condition into a hardened structural condition), in order to form junctions between a pair of such components and a head tube insert, a bottom bracket insert or a seat tube insert, at the corners of the front triangle of a bicycle frame, in accordance with U.S. Pat. No. 4,900,048 to Darujinsky, the molded and cured components for forming the tubular portions of the frame are abutted with each other, an epoxy resin bonding material applied at the junction formed, and then one or more prepreg strips wrapped around the components to tie them together via an adhesive bond that is formed by curing of the prepreg strips. In the case of a frame that is assembled from uncured prepreg material, in accordance with various patents to Brent J. Trimble such as U.S. Pat. Nos. 4,850,607 and 4,902,458, prepreg materials for forming halves of the frame components are laid up in molds along with patches which define the junctions at which the head tube, bottom bracket and seat tube inserts are to be incorporated. The entire assemblage is cured and molded at the same time into at least the front triangle of the bicycle frame, the halves of the frame components and the patches all melding into a unified structure, as a result.

However, since the fiber reinforcement of such resin and fiber composite materials is capable of carrying a tensile stress loading that is many times greater than the resins with which they are impregnated, each seam represents a point of weakness. In order to enable transference of stress loadings from fiber to fiber across such seams, the edge areas of the pieces of prepreg must be overlapped in order to provide sufficient strength for transference of stresses. The strength of the composite in such overlapped regions (along the center line of two-part components and at the end of individual components of the frame) relies mostly on the adhesive interface in the overlap seam area. This, results in stress concentrations at the junctures, similar to the substantial stress concentrations between components of a conventional welded or brazed bicycle frame. Thus, to increase the strength of a bicycle frame made of composite materials, it is necessary to minimize or eliminate the presence of seams which represent stress concentration sites due to the relatively abrupt junctures between prepreg components or component sections, which can be as small as one inch in the case of the Trimble frames.

SUMMARY OF THE INVENTION

In view of the foregoing, it is a primary object of the present invention to achieve a bicycle frame formed of fiber reinforced, curable resin impregnated composite material that is integrally united into an effectively seamless frame that exhibits high strength, excellent durability, and light weight without detracting from design flexibility, as well as a method of producing such a frame.

In keeping with the foregoing object, it is another object of the present invention to provide an improved method by which composite tubes for a bicycle frame can be joined into a unitary structure which is less subject to stress concentrations at interfaces between components, so as to minimize the potential for failure of the structure in such areas.

A more specific object of the present invention is to enable a frame to be formed from components of resin impregnated layers of fiber reinforcement without the use of separate patches or strips as the structural mechanism for coupling components of the frame together.

These and other objects are achieved with a preferred embodiment of the method and frame in accordance with the present invention. In particular, an essentially seamless bicycle frame of fiber reinforced, resin impregnated composite material is produced having a top tube portion, hollow down tube portion, a seat tube portion, a head tube corner at which the top tube portion meets the down tube portion and a head tube insert is incorporated, a bottom bracket corner at which the down tube portion meets the seat tube portion and a bottom bracket insert is incorporated, and a seat tube corner at which the top tube portion meets the seat tube portion and a seat tube insert is incorporated.

The tube portions, themselves, are seamless, having been formed by molding and curing of tubular preforms that were produced by rolling or wrapping fabric sheets or unidirectional tapes of resin impregnated fiber material on a mandrel, and then, removing each of the hollow tube portions from the mandrel on which it is formed in an uncured tubular form. Additionally, connector tube sections, which are integrated into the corners, are also formed in this manner, as can seat and chain stay tube sections.

For purposes of forming the corners, at least two integral flap portions are produced, on at least one end of at least one of the hollow tubular preforms to be joined, by axially slitting it. Each of these flap portions is placed in an overlapping relationship with respect to at least one of a portion of another of the tubular preforms, a respective insert and a connector tube section to produce a corner assembly. The corner assembly is molded and cured within a mold in a manner creating at least one of the above-noted corners, into which the respective insert has been incorporated, by the formation of a unitary wall extending around the insert. This unitary wall is formed of the overlapping portions of the hollow tubular preforms and connector tube section which have been integrally united with each other by the molding and curing operation.

As a result, the frame produced, in accordance with the invention, requires no connecting strips or patches to join circumferentially continuous tubular components of the frame. Furthermore, the insert incorporating corners at which the tube portions meet are essentially seamless due to the fact that they are defined by integral flaps forming part of these components and by circumferentially continuous annular connector tube sections. Stress concentrations are avoided due to the substantial overlap of the flaps of the components being connected and the fact that at each end of the overlap, one of the overlapped flaps is an integral part of a tube portion. To fill out and provide a finished appearance to the junctions, a structural foam and, optionally, non-structural, cosmetic prepreg coverings are also incorporated into the corners during the molding and curing operation.

The concepts of the present invention are also extended to the production of seat and chain stays for bicycle frames. In this case, a pair of seamless, hollow tubular components and a connector section are created on a mandrel in the same manner as for the front triangle. However, in this case, none of the tubular components are split to form flaps at either end. Instead, a respective end of a pair of components for forming the legs of a chain stay or seat stay are inserted into an end of a tubular connector section, creating a fork-like assembly. Cores are inserted in the opposite ends of the tubular components and inflatable bladders extend through the tubular components, from the vicinity of the cores, out through the connector section. A structural foam is utilized to fill out the remainder of the area within the connector section and a nonstructural, cosmetic strip of prepreg can be laid upon the crotch of the fork-like assembly to give a more finished appearance to the stay which results from molding and curing of the fork-like assembly.

Still further, for interconnecting the produced chain stay and seat stay, and for providing the rear axle engaging element, a two component assembly is provided. Firstly, an L-shape frame end part is provided which can be plugged into the free end of the legs of the chain stay fork and seat stay fork, and to which replaceable adjustable drop-out pieces are mountable. By this arrangement, various rear axle widths can be easily accommodated and exact alignment of the axle of the rear wheel is also obtainable. This is important since, unlike metals, stays of fiber and resin composite materials cannot be bent in order to adjust the rear wheel axle alignment. Furthermore, since the rear derailer hanger section is typically broken off or bent in a crash, the separate, adjustable drop-out, which also forms the derailer hanger, may be easily replaced.

These and other features of the present invention will become more apparent from the following detailed description of the preferred embodiment, particularly, when viewed in conjunction with company drawings.

BRIEF DESCRIPTION OF THE DRAWINGS

FIG. 3 is a perspective view for depicting an intermediate step in accordance with the method of assembly of the present invention;

FIG. 6 is a schematic bottom view of a bottom corner of the front triangle of FIG. 1;

DETAILED DESCRIPTION OF THE PREFERRED EMBODIMENT

Figure 1:
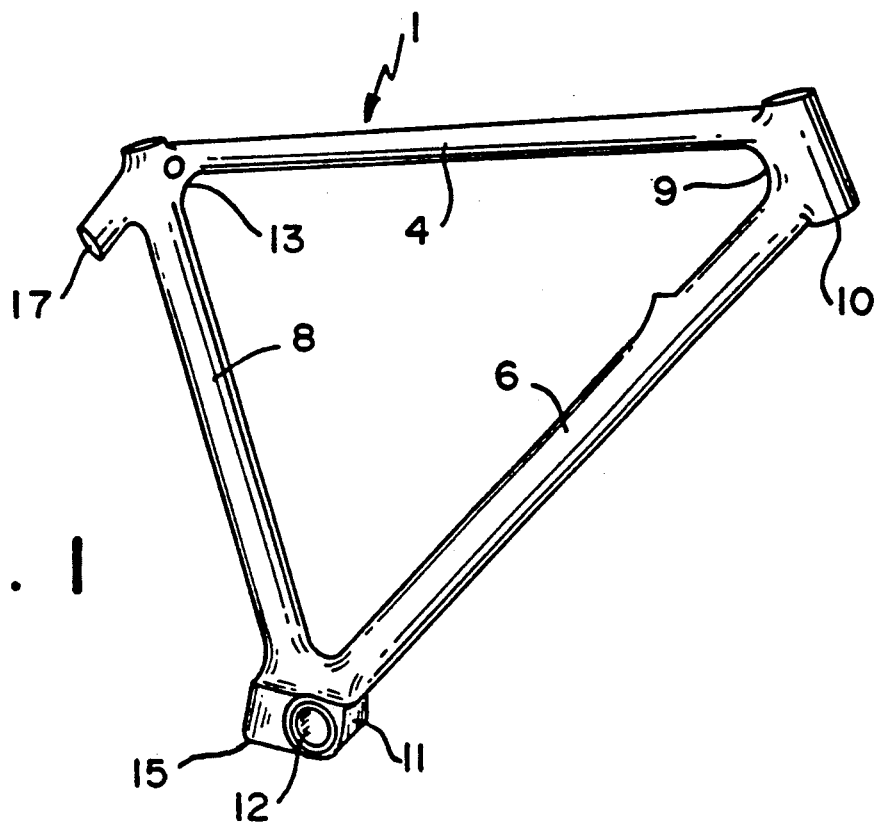
FIG. 1 is a perspective view of a front triangle of a bicycle frame produced in accordance with the preferred embodiment of the present invention.

In FIG. 1, a front triangle 1 is shown which, together with a seat-chain stay rear wheel assembly 2 (FIG. 2), form a complete bicycle frame. Front triangle 1 comprises a top tube portion 4, a down tube portion 6 and a seat tube portion 8. The top tube 4 and the down tube 6 are united together to form a front corner 9 of the triangle 1 into which a head tube 10 is incorporated. At the bottom of front triangle 1, the down tube 6 and seat tube 8 are united together to form a lower corner 11 of the triangle 1, into which a bottom bracket 12 for a pedal crank is incorporated. Lastly, at a rear corner 11 of the front triangle 1, the seat tube 8 and top tube 4 are united together with a seat tube insert 14 incorporated therein.

At the lower corner 11 and the rear corner 13, sockets 15, 17 are formed for receiving a chain stay 18 and a seat stay 20 of the seat-chain stay rear wheel assembly 2. Each of the stays 18, 20 has a fork-like shape comprised of pair of legs 18a, 18b, and 20a, 20b, respectively, which merge into base plug 18c, 20c for mounting within the sockets 15, 17 respectively.

Each of the tube portions, 4, 6, 8, are formed from seamless hollow preforms of a prepreg material. In particular, these preforms are constructed utilizing a structural fiber and resin composite material in which the structural fibers are, preferably, unidirectional and may include such commercially available fibers as graphite fibers, glass fibers, aramid fibers, polyethylene fibers or other fibers or combinations of fibers known to be utilizable for composite materials. In the preferred embodiment of the present invention, a prepreg material comprised of approximately 90% unidirectional graphite fibers and approximately 10% glass fabric and aramid fabric is utilized that is impregnated with an epoxy resin.

Multiple sheets of the above-described preprag material of lengths equal to the designed number of circumferential wraps are continuously wrapped around a mandrel and then removed in an uncured tubular form. This technique for forming tubes of composite material that have a constant diameter, taper, or have irregular shapes, e.g., such as flaired ends, is known (see "Tube Rolling", *Engineered Materials Handbook*, Vol. I, 1987, American Society for Metals). In utilizing this technique of forming hollow tubular preforms which are used to create the tubular portions 4, 6, 8, of triangle 1, preferably, in accordance with the preferred embodiment, a laminate construction is produced having, for example, six plys, one-third of which are oriented at zero degrees, relative to the longitudinal axis of the tubular preforms, one-third at +30 degrees relative to its longitudinal axis and one-third at −30 degrees relative to the longitudinal axis of the preform.

As will be apparent from the following description, each of the corners 9, 11, 13 of the front triangle 1 will have a different construction and is formed in a different manner. Nonetheless, each of these corners 9, 11, 13 is formed via techniques sharing common basic attributes in accordance with the present invention to provide a frame having a unified corner construction of high strength. Thus, the formation and construction of each of the corners 9, 11, 13 will be described separately and their common attributes summarized thereafter.

Figure 4:
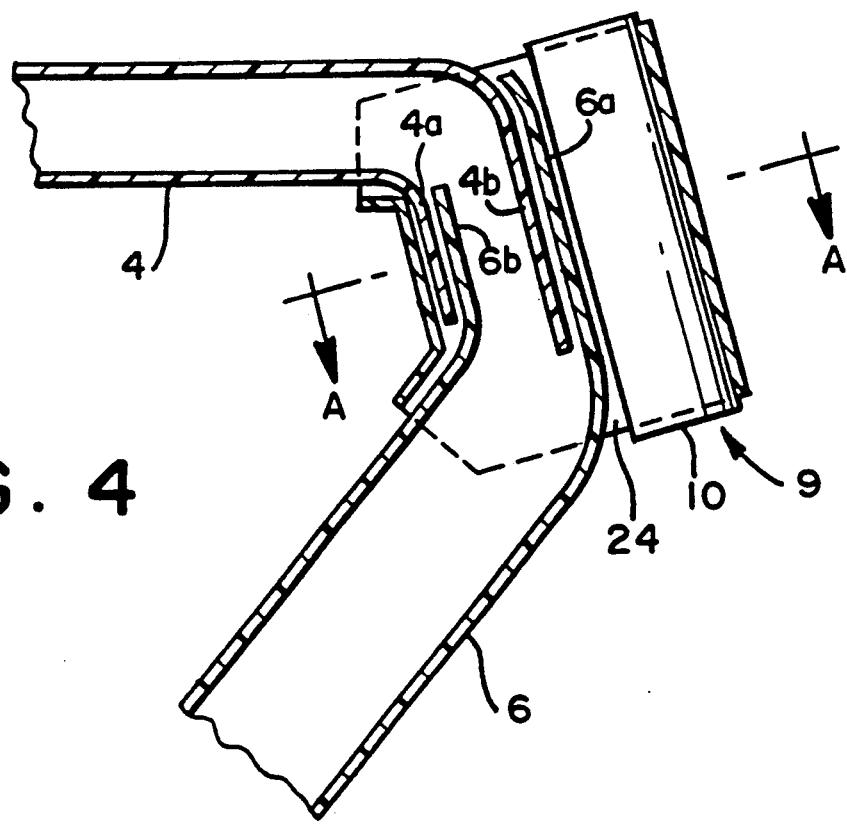
FIG. 4 is a schematic view depicting a head tube corner of the front triangle shown in FIG. 1.
Figure 5:
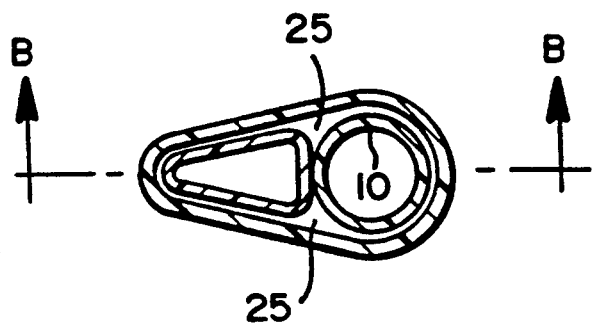
FIG. 5 is a schematic sectional view taken along line A—A in FIG. 4.

Turning now to FIG. 3-5, front corner 9 will be described first. After tubular uncured preforms of the appropriate length and diameter to form the top tube portion 4 and down tube portion 6 of the frame 1 are removed from the respective mandrel, the end of each preform which is to be used to form the corner 9 is axially slit to form at least two flaps that are 4–6 inches in length (see flaps 4a, 4b and 6a, 6b in FIG. 3). The same is done with the opposite ends of this pair of uncured preforms. An inflatable bladder of a length that is greater than the perimeter of the front triangle (for reasons which will become apparent later on) has its closed end disposed proximate the end of tube portion 4 which will be used to form corner 13, and extends from that point along the length of the preform and then through and out the preform which forms hollow tube portion 6. The integral flap portions 4a, 4b are brought into overlapping relationship along substantially their entire length. In this respect, it is noted that whether the flaps 4a, 4b are both upon the exterior of flaps 6a, 6b, or vice versa, or whether one of the flaps 4a, 4b is on the outside of a respective flap 6a, 6b while the other flap is on the inside, is not critical.

A connector tube section 24, having been formed by being wrapped on a mandrel in a similar manner to the preforms of tube portions 4, 6, 8 (except that, preferably, all plys of prepreg material are wrapped at zero degrees) is slid into position over the flaps 4a, 4b and 6a, 6b. Furthermore, head tube insert 10 is disposed within the connector tube section 24 between the overlapped flaps and the inside surface of the connector tube section 24, as shown in FIG. 4 and 5. The head tube insert 10 is formed of metal (preferably aluminum) and it may be wrapped with a single ply of uncured prepreg prior to insertion into the connector tube section 24. Since the bladder 22, once inflated within the mold, will not be able to insure proper compaction in the inter space zones 25 (FIG. 5) and to fill out and provide a finished appearance to the corner 9, a sufficient quantity of expandable fiber-reinforced structural epoxy foam is placed within the connector tube section 24 along the length of the insert 10.

For assembling the components necessary to create bottom corner 11, the corresponding end of the uncured tubular preform for forming seat tube portion 8 is also axially slit about 4–6 inches. However, unlike the case of the other two preforms, 4, 6, the opposite end of the uncured tube portion 8 is not slit. After at least two flaps 8a, 8b have been formed, the uncured tube portion 8 is strung onto the same bladder 22 with the preforms of tube portions 4, 6. As can be seen with reference to FIG. 6, in assembling corner 11, only the innerflaps 6c, 8a are directly overlapped. Furthermore, connector tube section 26 does not surround the insert 12 and the entire flap area. Instead, connector tube section 26 is utilized to form socket 15 and it internally connects the outer flaps 6d, 8b together.

More specifically, the outer flap 6d is brought over bottom bracket insert 12 into overlapping relationship with respect to the bottom side of connector tube section 26, either externally, as shown, or by being inserted into the connector tube section 26. The flap 8b is laid upon the innerside of connector tube section 26 and extends beyond the bottom bracket insert 12. As with flap 6d, flap 8b could be inserted into connector tube 26 so as to engage the inner side of the top wall instead of the outer side thereof. Also, if it is desired to have a projecting socket 15, instead of one that is recessed within the bottom corner 11, the flap 8b could be disposed behind the connector tube section 26 and wrapped (clockwise with respect to the showing of FIG. 6) onto bottom bracket insert 12.

In order to form the socket 15 within the connector tube section 26, a core pin 30 (FIG. 8) is inserted within the connector tube portion. Lastly, a quantity of expandable, fiber-reinforced structural epoxy foam is placed inside the corner section 11, which is sufficient to enable the structural foam to fill out the area below line 31 of FIG. 6, which line represents the wall of the bladder 22, when fully inflated.

To form the seat tube corner 13, metal seat tube insert 14 is inserted into the top of the seat tube preform. Seat tube insert 14, advantageously, has a small metal tube 14a brazed onto it at right angles, and the intersecting wall surfaces having been cut out, so that the interior of the small metal tube 14a communicates directly with the interior of the seat tube 14 in the area that they are brazed together. This small metal tube 14a accepts a binder bolt assembly which is used to clamp the seat in proper position during riding and allows the binder bolt assembly to be incorporated within corner 13. The flaps of the preform of top tube 4 (only flap 4c of which is visible in FIG. 7) are wrapped around the sides of the preform of seat tube 8 at the same area where the metal seat tube insert 14 is located, with an opening being provided in the vicinity of the small binder bolt tube 14a in order to enable a mold pin, used to hold the seat tube insert in the proper position and orientation to be passed from one mold half through the binder bolt tube 14a into the wall of the opposite mold half.

Figure 7:
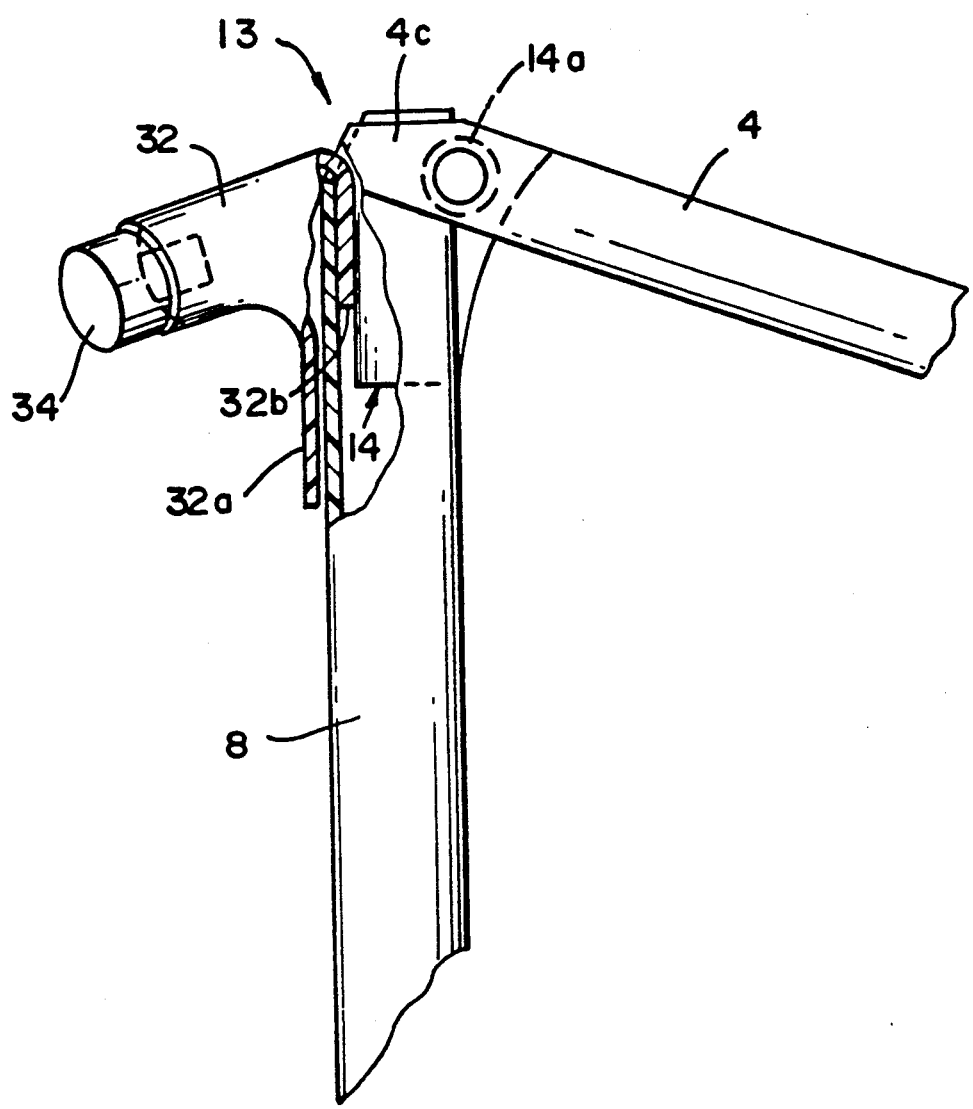
FIG. 7 is a partial sectional view depicting a seat tube assembly for forming the rear corner of the front triangle of FIG. 1.

At the opposite side of the seat tube insert 14, a connector tube section 32 is provided to form a gooseneck socket for attachment of a seat stay. In particular, connector tube section 32 is axially split for 4–6 inches, as done for the tube portion preforms, and one flap 32a is applied onto the outside of the preform of seat tube portion 8 and a second flap 32b is placed inside of this preform, between its inner surface and the outer surface of seat tube insert 14, as shown in FIG. 7. In order to maximize compaction and structural strength in this area, an expandable, fiber-reinforced structural epoxy foam is placed inside of the seat stay socket forming connector tube section 32 and a core pin 34 is inserted into the free end of the connector tube section 32 to define the inside wall of the seat stay socket.

Figure 8:
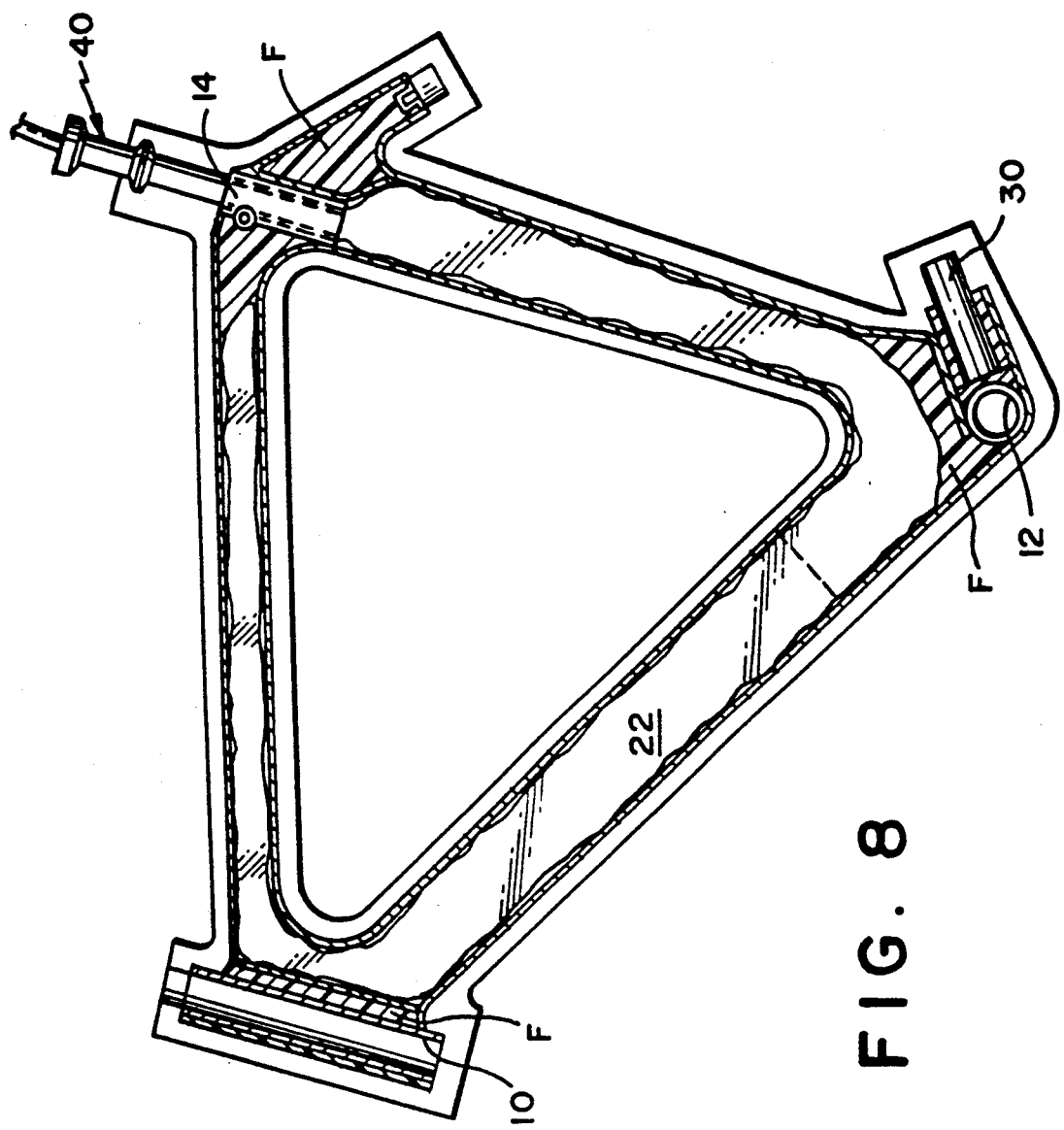
FIG. 8 is a sectional view through the front triangle of FIG. 1 prior to removal thereof from the mold in which it is formed.

As with the other inserts 10, 12, insert 14 may be wrapped with a single ply of prepreg material; however, in this case, due to the presence of tube 14a, such a ply would not be wrapped so as to completely cover the outer surface of the insert 14. Also, as was the case in forming the other corner sections 9, 11, a quantity of expandable fiber resin reinforced epoxy foam is applied to fill out the corner area and also serves to protect the bladder 22 against damage by the metal insert when it is expanded within the mold. In this regard, as can be seen in FIG. 8, in the finished frame, the foam has filled out the corner areas and is located between the bladder 22 (which is not removed from the finished product) and the inserts and contributes significantly to the structural strength of the corner areas of the resultant frame structure.

While the specific construction and techniques used at each of the corners 9, 11, 13 vary, it should be apparent from the foregoing that certain basic attributes are always present. Firstly, at least two hollow tubular preforms and at least one connector tube section of an uncured structural resin and fiber composite material that have been formed by wrapping of sheets of resin impregnated fiber material on a mandrel are always used in uncured tubular form after forming of at least two integral flap portions on at least one end of at least one of the two hollow tubular preforms (and in the case of connector 32, also on it) by axially slitting at least one end thereof. A corner assembly is then prepared from these components and the respective inserts by placing each one of the flap portions in an overlapping relationship with respect to at least one of a portion of (1) another of the hollow tubular preforms, (2) a respective insert, and (3) a connector tube section.

Furthermore, during molding of the tubular portions from the preforms, an inflatable bladder, internally supports and compresses the composite material while the epoxy foam in the corner areas insures sufficient compaction and structural strength in these areas. The molding and curing of the preforms and corner assembly within a mold results in each insert being incorporated into a unitary wall that extends around the insert due to the fact that the resin impregnated fiber materials of which the uncured hollow tubular preforms and connector tube section are formed integrally unite together as a result of the molding and curing thereof. In this regard, it is noted that since any of the various known prepreg composite materials may be utilized in the inventive method to produce the inventive frame, the molding temperature and pressure, themselves, will vary in accordance with the dictates for molding and curing of these known materials, so that these specific factors form no part, per se, of the present invention.

Likewise, while the use of a single bladder which runs from an open end which extends out through seat tube insert 14, past each of the corners 11, 9, back into proximity of the seat tube insert 14 is new, the use of inflatable bladders, per se, is not. Thus, the manner in which the open end of the inflatable bladder 22 may be connected to an air supply connector assembly (indicated generally at 40 in FIG. 8) and the range of inflation pressures utilizable to compress the layers of uncured fiber reinforced resin against the interior surfaces of the mold, are known to those skilled in the are (see, for example, Duplessis et al. U.S. Pat. No. 4,828,781) and, thus, not need be described in detail herein.

Figure 2:
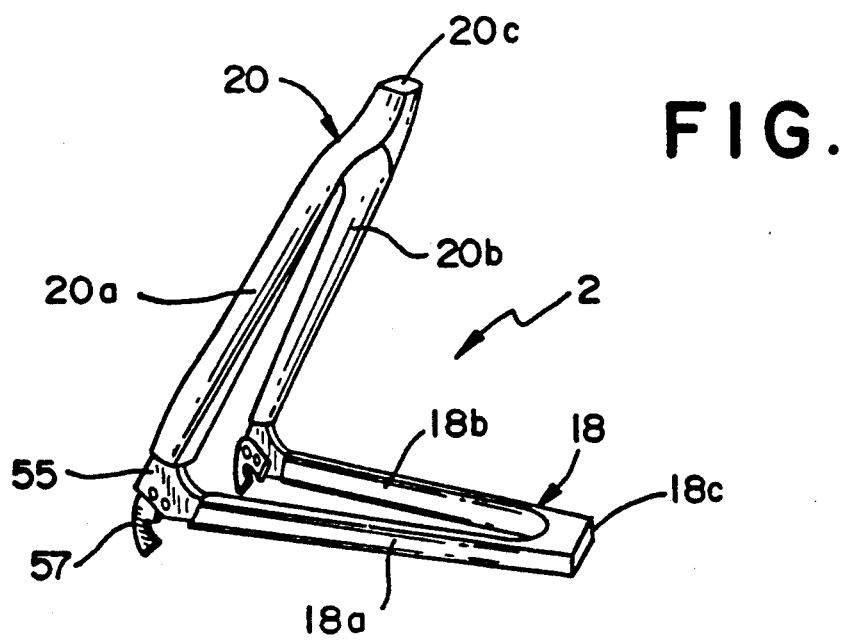
FIG. 2 is a side perspective view of a rear stay assembly for use in conjunction with the front triangle of FIG. 1, in accordance with the present invention.
Figure 9:
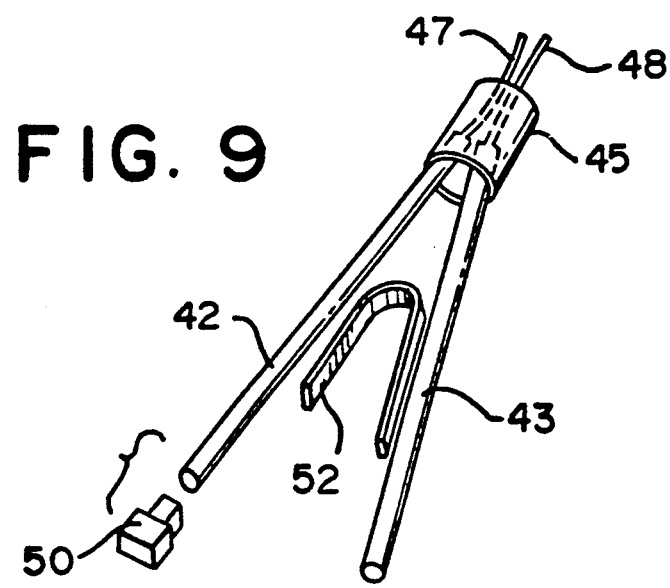
FIG. 9 is schematic depiction of an assembly for production of fork-like stays in accordance with the present invention.
Figure 10:
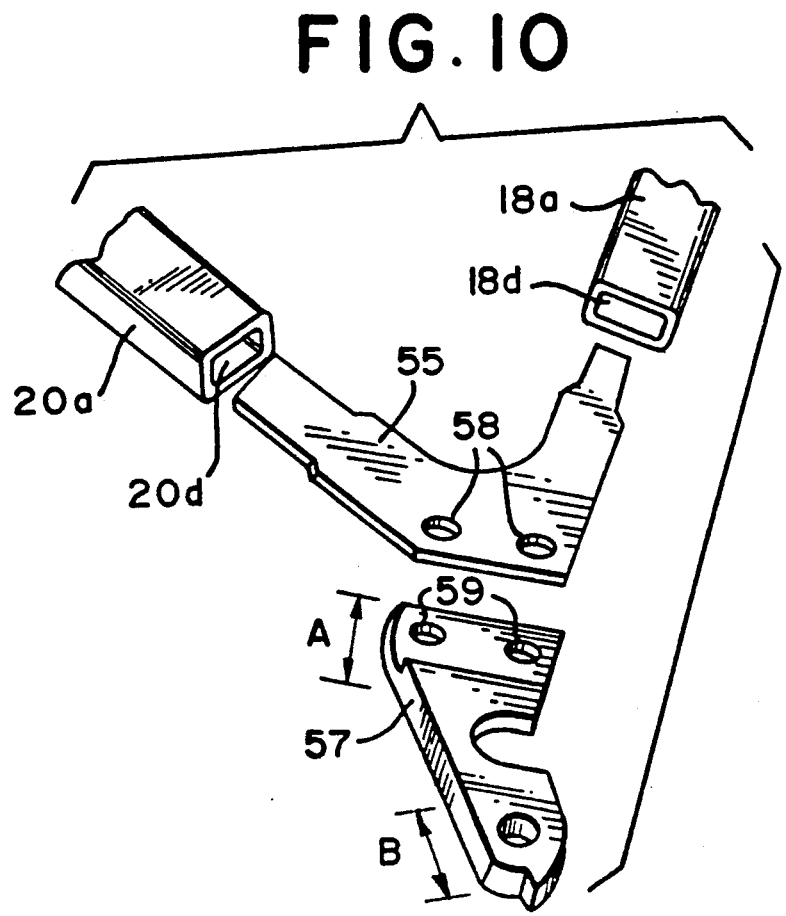
FIG. 10 is a partial perspective, exploded view of a rear axle engaging element assembly and a portion of ends of legs of chain and seat stays to which it connects.

With reference to FIGS. 9 and 10, formation of the chain-seat stay rear wheel assembly of FIG. 2 will now be described. Firstly, for forming the wishbone-shaped chain stay 18 and seat stay 20, in each case, a pair of tubular preforms 42, 43 and a connector tube section 45 are produced by rolling of prepreg composite materials in the same manner used to produce the tubular preforms for forming the tube portions 4, 6, 8 and connector tube section 24, 26, 32. The closed end of separate bladders 47, 48 are inserted into each of the tubular preforms 42, 43 and terminate at the end of a respective core pin 50 (only one of which is shown in FIG. 9) that is inserted into the free end of the preforms 42, 43. These core pins form sockets 18d, 20d in the free ends of each leg of the chain and seat stays. Connector section 45 is, preferably, formed of six plys of prepreg material, all of which have been wrapped at zero degrees relative to its longitudinal axis, and it is telescoped over the ends of the tubular preforms 42, 43. A quantity of expandable fiber reinforced epoxy foam is placed inside of connector 45 to fill out the fork of the wishbone-shape and to provide adequate compaction during molding and curing. Furthermore, a nonstructural, cosmetic flap preform 52, preferably comprised of eight layers of prepreg that are all oriented at zero degrees may be applied to line the crotch of the fork of the stays to improve the appearance of the finished structure.

It is noted that the resultant wishbone-shaped stay, itself, lacks adequate hoop strength. However, this deficiency is eliminated when the ends 18c, 20c are plugged into and adhesively bonded within the respective sockets 15, 17, which lend the required hoop strength to the chain stay and seat stay components. Each leg 18a, 18b is connected to a respective leg 20a, 20b of the seat stay by an L-shaped frame end 55, which can be formed of stainless steel, aluminum, or composite materials. Each frame end 55 is plugged into and bonded within a pair of leg sockets 18d, 20d, after which they are neither adjustable nor easily replaceable.

To accommodate various rear axle lengths, adjustable drop-outs 57, formed of steel, aluminum, or from composite materials, are removably mounted to the L-shaped frame 55 by screws that are passed through the matched sets of holes 58, 59. The significance of this feature is that, for example, the standard distance between seat tube rear axle engaging drop-outs for bicycle frames is normally 126 mm, but some rear hub assemblies which have eight sprockets require a 130 mm drop-out clearance. As can be seen from FIG. 10, section A of drop-out 57 has a reduced thickness that is stepped at one side of the drop-out. By mounting frame end 55 at the stepped side of area A, the reduced thickness allows the wide hub clearance required for an eight sprocket hub to be obtained. However, dropout 57 can be easily replaced by another drop-out, which lacks this stepped area of reduced thickness, for accommodating rear wheels having normal rear hub assembly clearance requirements.

This feature also allows for easy replacement of the drop-out in the case of damage to this part after a crash, the rear derailer hanger portion typically being broken off or bent during a crash if the rear derailer is impacted during the crash. This problem is quickly, easily and economically fixed simply by replacing the damaged drop-out 57 with another.

Most importantly, this feature is particularly significant with respect to composite frames since frames of such materials cannot be realigned after molding because fiber reinforced resin composites are not reshapable by bending once cured, unlike metal frames which can be bent in order to adjust the alignment of the rear wheel axle. Thus, by providing separate removable drop-outs, it becomes possible to achieve upward, downward, backward and forward adjustments for purposes of alignment of the axle of the rear wheel.

It can be appreciated that the same rear wheel mounting assembly 2 can be utilized with a variety of different size frames simply by insuring that a standardized size chain stay socket 15 and seat stay socket 17 is formed on the various different frames. This standardization of rear wheel mounting assemblies contributes to a more economically producable family of bicycle frames. Furthermore, production of the chain and seat stays separately from the front triangle simplifies their production and production of the frame as a whole, while allowing the stays to be formed of hollow tubular preforms using bladders. This construction also takes into consideration a recognition of the fact that the seat stay and chain stay components are not subjected to the same magnitude and type of loading as is the front triangle of the bicycle frame, and that hoop strength weaknesses of such wishbone-shaped structures can be compensated for in the final frame assembly by plugging them into sockets on the front triangle which possess the requisite hoop strength characteristics.

While only a single embodiment has been shown and described with respect to the present invention, it should be understood that the present invention is not limited to this one embodiment, but rather is susceptible to numerous changes and modifications as known to those skilled in the art. Therefore, I do not wish to be limited to the detail shown and described herein, and intend to cover all such changes and modifications as are encompassed by the scope of the appended claims.

I claim:

1. The method of molding a front triangle of a bicycle frame having a top tube portion, a down tube portion, a seat tube portion, a head tube corner at which said top tube portion meets said down tube portion and at which a head tube insert is incorporated, a bottom bracket corner at which said down tube portion meets said seat tube portion and at which a bottom bracket insert is incorporated, and a seat tube corner at which said top tube portion meets said seat tube portion and at which a seat tube insert is incorporated, said method comprising the steps of:

forming at least two hollow tubular preforms and at least one connector tube section of an uncured structural resin and fiber composite material, each tubular preform and tube section being formed on a mandrel by wrapping layers of resin impregnated fiber material thereon, and then removing each of said at least two hollow tubular preforms and said at least one connector tube section from the mandrel on which it is formed in uncured tubular form;

forming at least two integral flap portions on at least one end of at least one of said at least two hollow tubular preforms by axially slitting said at least one end;

placing each one of said flap portions of said at least one of said at least two hollow tubular preforms in an overlapping relationship with respect to at least one of a portion of another of said at least two hollow tubular preforms, a respective insert and a said connector tube section to form at least one corner assembly;

disposing said at least two hollow tubular preforms and said at least one corner assembly within a mold; and molding and curing said tubular preforms and said corner assembly within the mold in a manner creating at least one of said corners and the tube portions which meet thereat, the respective insert being incorporated into a unitary wall extending around said insert by the integral uniting together of the resin impregnated fiber material of which the hollow tubular preforms and connector tube section are formed resulting from said molding and curing.

2. The method according to claim 1, wherein a structural foam is applied to the respective insert prior to said molding and curing step, said structural foam filling out and supporting portions of said corner assembly during said molding and curing step, and hardening into a portion of said corner.

3. The method according to claim 1, wherein said at least one corner assembly forms said head tube corner; wherein the step of forming integral flap portions is performed on corresponding end portions of hollow tubular preforms for forming both of said down tube and top tube portions; wherein the respective flap portions of the hollow tubular preforms forming the down tube and top tube portions are placed in an overlapped relationship with respect to each other within a said connector tube section; and wherein the head tube insert is disposed within the connector tube section, between the overlapped flap portions and the connector tube section.

4. The method according to claim 2, wherein a structural foam is applied to said head tube insert prior to said molding and curing step, said structural foam hardening into a portion of said head tube corner at an inner side of the head tube insert.

5. The method according to claim 1, wherein the at least one corner comprises said bottom bracket corner; wherein the step of forming the integral flap portions is performed on corresponding end portions of hollow tubular preforms for forming said down tube and seat tube portions; wherein an inner flap portion of each of said down tube and seat tube forming hollow tubular preforms are placed in overlapped relationship with respect to each other; wherein said bottom bracket insert is disposed between said overlapped flap portions and the other of said flap portions; wherein an outer flap portion of the seat tube forming hollow tubular preform is placed in overlapped relationship to at least one of a topside of the connector tube section and an outer surface part of the bottom bracket insert; and wherein an outer flap portion of the down tube forming hollow tubular preform is extended partially around the bottom bracket insert and into overlapping relationship with a bottom side of the connector tube section; and wherein a core pin is inserted into the connector tube section for forming a chain stay socket.

6. The method according to claim 5, wherein a structural foam is applied to said bottom bracket insert prior to said molding and curing step, said structural foam hardening into a portion of said corner bounding said bottom bracket insert and chain stay socket.

7. The method according to claim 1, wherein the at least one corner comprises said seat tube junction; wherein the step of forming the integral flap portions is performed on a respective end portion of a hollow tubular preform for forming said top tube and on a said connector tube section into an opposite end of which a core pin is inserted for forming a seat stay socket portion; wherein the flap portions of the top tube hollow tubular preform are wrapped about a respective end portion of the hollow tubular preform forming the seat tube; wherein said seat tube insert is inserted into said end portion of the seat tube forming hollow tubular preform; and wherein an outer flap portion of the seat stay socket forming connector tube is applied over said end portion of the seat tube portion forming hollow tubular preform, and an inner flap portion of the seat stay socket forming connector tube section is inserted between the seat tube forming hollow tubular preform and the seat tube insert.

8. The method according to claim 7, wherein a structural foam is applied to said seat tube insert prior to said molding and curing step, said structural foam hardening into a portion of said corner surrounding said insert and filling out said seat stay forming connector section.

9. The method according to claim 1, wherein said frame assembly defines a front triangle of a bicycle and all of said corners are formed simultaneously within a single mold.

10. The method according to claim 9, wherein a single inflatable bladder is used for internally supporting said hollow tubular preforms during the molding end curing step, said bladder having an open end extending out through said seat tube insert, and said bladder extending, from said open end, through a seat tube forming hollow tubular preform, and into and through a down tube forming hollow tubular preform, and into and along a top tube forming hollow tubular preform to a closed end in an area proximate said seat tube insert.

11. The method according to claim 10, wherein a structural foam is disposed between the bladder and each of the inserts prior to inflation of the bladder.

12. The method according to claim 11, wherein for forming said head tube corner, the step of forming integral flap portions is performed on corresponding end portions of hollow tubular preforms forming both of said down tube and top tube portions; wherein the respective flap portions of the hollow tubular preforms forming the down tube and top tube portions are placed in an overlapped relationship with respect to each other within a said connector tube section; wherein the head tube insert is disposed within the connector tube section, between the overlapped flap portions and the connector tube section; and wherein the structural foam is applied to said head tube insert prior to said molding and curing step, said structural foam filling out and supporting portions of the head tube corner assembly during said molding and curing step, and hardening into a portion of said head tube corner.

13. The method according to claim 12, wherein for forming said bottom bracket junction, the step of forming the integral flap portions is performed on corresponding end portions of hollow tubular preforms for forming said down tube and seat tube portions; wherein an inner flap portion of each of said down tube and seat tube forming hollow tubular preforms are placed in overlapped relationship with respect to each other; wherein said bottom bracket insert is disposed between said overlapped flap portions and the other of said flap portions; wherein an outer flap portion of the seat tube forming hollow tubular preforms is placed in overlapped relationship relative to at least one of a topside of the connector tube section and an outer surface part of the bottom bracket insert; wherein an outer flap portion of the down tube forming hollow tubular preform is extended partially over the bottom bracket insert and into overlapping relationship with a bottom side of the connector tube section; wherein a core pin is inserted into said respective connector tube section for forming a chain stay socket; and wherein structural foam is applied to said bottom bracket insert prior to said molding and curing step, said structural foam filling out and supporting portions of said bottom bracket corner during said molding and curing step, and hardening into a portion of said bottom bracket corner.

14. The method according to claim 13, wherein the structural foam applied to said bottom bracket insert forms a portion of said the bottom bracket corner bounding the bottom bracket insert and chain stay socket.

15. The method according to claim 14, wherein for forming said seat tube corner, the step of forming the integral flap portions is performed on a respective end portion of a hollow tubular preform for forming said top tube and on a said connector tube section into an opposite end of which a socket core pin is inserted for forming a seat stay socket portion; wherein the flap portions of the top tube hollow tubular preform are wrapped about a respective end portion of the hollow tubular preform forming the seat tube; wherein said seat tube insert is inserted into said end portion of the seat tube forming hollow tubular preform; wherein an outer flap portion of the seat stay socket forming connector tube is applied over said end portion of the seat tube forming hollow tubular preform, and an inner flap portion of the seat stay socket forming connector tube section is inserted between the seat tube portion forming hollow tubular preform and the seat tube insert; and wherein structural foam is applied to said seat tube insert prior to said molding and curing step, said structural foam filling out and supporting portions of the seat tube corner assembly during said molding and curing step, and hardening into a portion of said seat tube corner.

16. The method according to claim 15, wherein each of said inserts has at least one layer of structural resin and fiber composite material at least partially wrapped thereon.

17. The method according to claim 10, wherein each of said inserts has at least one layer of structural resin and fiber composite material at least partially wrapped thereon.

18. A bicycle frame produced in accordance with the method of claim 15.

19. A bicycle frame produced in accordance with the method of claim 1.

20. A bicycle frame having a front triangle comprising a hollow top tube portion, a hollow down tube portion, a hollow seat tube portion, a head tube corner at which said top tube portion and said hollow down tube portion meet and at which a head tube insert is incorporated, a bottom bracket corner at which said down tube portion and said seat tube portion meet and at which a bottom bracket insert is incorporated, and a seat tube corner at which said top tube portion and said seat tube portion meet and at which a seat tube insert is incorporated;

wherein at least one of said corners comprises two of said hollow tube portions and a connector tube section that are made of a structural resin and fiber composite material that is composed of a structural resin and a fiber reinforcement, said composite material being in a circumferentially continuous tubular form, at least one end portion of at least one of said two hollow tube portions having at least two integral flap portions, the fiber reinforcement of which is of one piece with the fiber reinforcement in said connector tube section of tubular form;

wherein each one of said flap portions of said at least one of said two hollow tube portions is in an overlapping relationship with respect to at least one of a portion of the other of said two hollow tube portions, a respective insert, and the said connector tube section to form a corner assembly; and wherein the respective insert is incorporated into a unitary wall extending around said insert, said unitary wall being comprised of a structural resin and fiber composite material of which the hollow tube portions and connector tube section are formed, said resin of the composite material being in an integrally united, molded and cured form.

21. The bicycle frame according to claim 20, wherein said at least one corner comprises said head tube corner; wherein the integral flap portions are on corresponding end portions of said down tube and top tube portions; wherein the respective flap portions of the down tube and top tube portions are in an overlapped relationship with respect to each other within a said connector tube section; and wherein the head tube insert is disposed within the connector tube section, between the overlapped flap portions and the connector tube section.

22. The bicycle frame according to claim 21, wherein a structural foam fills out portions of said head tube junction at said head tube insert.

23. The bicycle frame according to claim 20, wherein the at least one corner comprises said bottom bracket corner; wherein the integral flap portions are formed on corresponding end portions of said down tube and seat tube portions; wherein an inner flap portion of each of said down tube and seat tube portions are in overlapped relationship with respect to each other; wherein said bottom bracket insert is disposed between said overlapped flap portions and the other of said flap portions; wherein an outer flap portion of the seat tube portion is in overlapped relationship relative to at least one of a topside of the connector tube section and an outer surface part of the bottom bracket insert; and wherein an outer flap portion of the down tube portion extends partially around the bottom bracket insert and into overlapping relationship with a bottom side of the connector tube section; and wherein a chain stay socket is formed in the connector tube section.

24. The bicycle frame according to claim 23, wherein a structural foam fills out portions of said bottom bracket junction at said bottom bracket insert.

25. The bicycle frame according to claim 20, wherein the at least one corner comprises said seat tube corner; wherein the integral flap portions are formed on a respective end portion of said top tube and on said connector tube section in which a seat stay socket is formed; wherein the flap portions of said top tube portion are wrapped about a respective end portion of the seat tube portion; wherein said seat tube insert is disposed within said end portion of the seat tube portion; and wherein an outer flap portion of the seat stay socket forming connector tube section overlies said end portion of the seat tube portion, and an inner flap portion of the seat stay socket forming connector tube section is disposed between the seat tube portion and the seat tube insert.

26. The bicycle frame according to claim 25, wherein a structural foam fills out a portion of said seat tube corner at said seat tube insert.

27. The bicycle frame according to claim 20, wherein a single bladder is disposed internally within said hollow tube portions, extending from said seat tube insert, through the seat tube portion, into and through the down tube portion, and into and along the top tube portion to an end in an area proximate said seat tube insert.

28. The bicycle frame according to claim 27, wherein a structural foam is disposed between the bladder and each of the inserts.

29. The bicycle frame according to claim 28, wherein, at said head tube corner: the integral flap portions are formed on corresponding end portions of said down tube and top tube portions; the respective flap portions of the down tube and top tube portions are in an overlapped relationship with respect to each other within said connector tube section; and the head tube insert is disposed within the connector tube section, between the overlapped flap portions and the connector tube section.

30. The bicycle frame according to claim 29, wherein, at said bottom bracket corner: the integral flap portions are formed on corresponding end portions of said down tube and seat tube portions; an inner flap portion of each of said down tube and seat tube portions are placed in overlapped relationship with respect to each other; said bottom bracket insert is disposed between said overlapped flap portions and the other of said flap portions; an outer flap portion of the seat tube portion is curled around the outside of the bottom bracket insert; and an outer flap portion of the down tube portion extends over part of the curled outer flap portion and into a connector tube section which forms a chain stay socket.

31. The bicycle frame according to claim 30, wherein, at said seat tube corner: the integral flap portions are formed on a respective end portion of said top tube portion and on a connector tube section forming a seat stay socket portion; the flap portions of said top tube portion are wrapped about a respective end portion of the seat tube portion; said seat tube insert is disposed within said end portion of the seat tube portion; and an outer flap portion of the seat stay socket forming connector tube section overlies said end portion of the seat tube portion, and an inner flap portion of the seat stay forming connector tube section is disposed between the seat tube portion and the seat tube insert.

32. The bicycle frame according to claim 31, wherein each of said inserts has at least one layer of structural resin and fiber composite material at least partially wrapped thereon.

33. The bicycle frame according to claim 20, wherein each of said inserts has at least one layer of structural resin and fiber composite material at least partially wrapped thereon.

* * * * *